(12) United States Patent
Takei et al.

(10) Patent No.: US 10,391,524 B2
(45) Date of Patent: Aug. 27, 2019

(54) ROTATING DRUM FOR WORKPIECE CONVEYANCE AND WORKPIECE CLEANING DEVICE

(71) Applicant: HIRAIDE PRECISION CO., LTD., Okaya-shi, Nagano (JP)

(72) Inventors: Hideo Takei, Okaya (JP); Kazutaka Fujimori, Okaya (JP); Masahiko Hiraide, Okaya (JP)

(73) Assignee: Hiraide Precision Co., Ltd., Okaya-shi, Nagano (JP)

( * ) Notice: Subject to any disclaimer, the term of this patent is extended or adjusted under 35 U.S.C. 154(b) by 181 days.

(21) Appl. No.: 15/565,084

(22) PCT Filed: Apr. 6, 2016

(86) PCT No.: PCT/JP2016/061268
§ 371 (c)(1),
(2) Date: Oct. 6, 2017

(87) PCT Pub. No.: WO2016/163402
PCT Pub. Date: Oct. 13, 2016

(65) Prior Publication Data
US 2018/0111170 A1 Apr. 26, 2018

(30) Foreign Application Priority Data

Apr. 9, 2015 (JP) .................................. 2015-080132
Apr. 9, 2015 (JP) .................................. 2015-080133

(51) Int. Cl.
*B08B 3/06* (2006.01)
*C23G 3/00* (2006.01)
(Continued)

(52) U.S. Cl.
CPC ................. *B08B 3/06* (2013.01); *B07B 1/22* (2013.01); *B07B 1/24* (2013.01); *B08B 3/022* (2013.01);
(Continued)

(58) Field of Classification Search
None
See application file for complete search history.

(56) References Cited

U.S. PATENT DOCUMENTS

2013/0263898 A1 10/2013 Takei et al.

FOREIGN PATENT DOCUMENTS

JP 6-254515 A 9/1994
JP 7-039971 U 7/1995
(Continued)

OTHER PUBLICATIONS

International Search Report (PCT/ISA/210) dated Jul. 19, 2016, by the Japanese Patent Office as the International Searching Authority for International Application No. PCT/JP2016/061268.
(Continued)

*Primary Examiner* — Rita P Adhlakha
(74) *Attorney, Agent, or Firm* — Buchanan Ingersoll & Rooney PC

(57) ABSTRACT

A rotating drum of a rotating drum-type workpiece cleaning device is provided with feed fins that extend helically along the inner circumferential surface of the drum body. The feed fins are, for example, fins in which metal sheets have been folded. On both sides of the feed fins, the angle of the internal corner between the feed fin and the inner circumferential surface of the drum body is an obtuse angle, for example, about 120 degrees. It is possible to prevent or limit the trapping of conveyed workpiece in the internal corner and trapping between adjacent fin sections.

13 Claims, 8 Drawing Sheets

(51) Int. Cl.
*F16C 13/00* (2006.01)
*B08B 3/02* (2006.01)
*B08B 3/04* (2006.01)
*B07B 1/22* (2006.01)
*B07B 1/24* (2006.01)
*C23G 3/02* (2006.01)

(52) U.S. Cl.
CPC .............. *B08B 3/024* (2013.01); *B08B 3/042* (2013.01); *C23G 3/00* (2013.01); *F16C 13/00* (2013.01); *C23G 3/023* (2013.01)

(56) References Cited

FOREIGN PATENT DOCUMENTS

| | | |
|---|---|---|
| JP | 2000-351097 A | 12/2000 |
| JP | 2001-129499 A | 5/2001 |
| JP | 2004-275819 A | 10/2004 |
| JP | 2007-138285 A | 6/2007 |
| JP | 2008-006364 A | 1/2008 |
| JP | 4126704 B | 7/2008 |
| JP | 4557888 B | 10/2010 |
| JP | 2014-050364 A | 3/2014 |
| WO | WO 2012/060047 A1 | 5/2012 |

OTHER PUBLICATIONS

Written Opinion (PCT/ISA/237) dated Jul. 19, 2016, by the Japanese Patent Office as the International Searching Authority for International Application No. PCT/JP2016/061268.

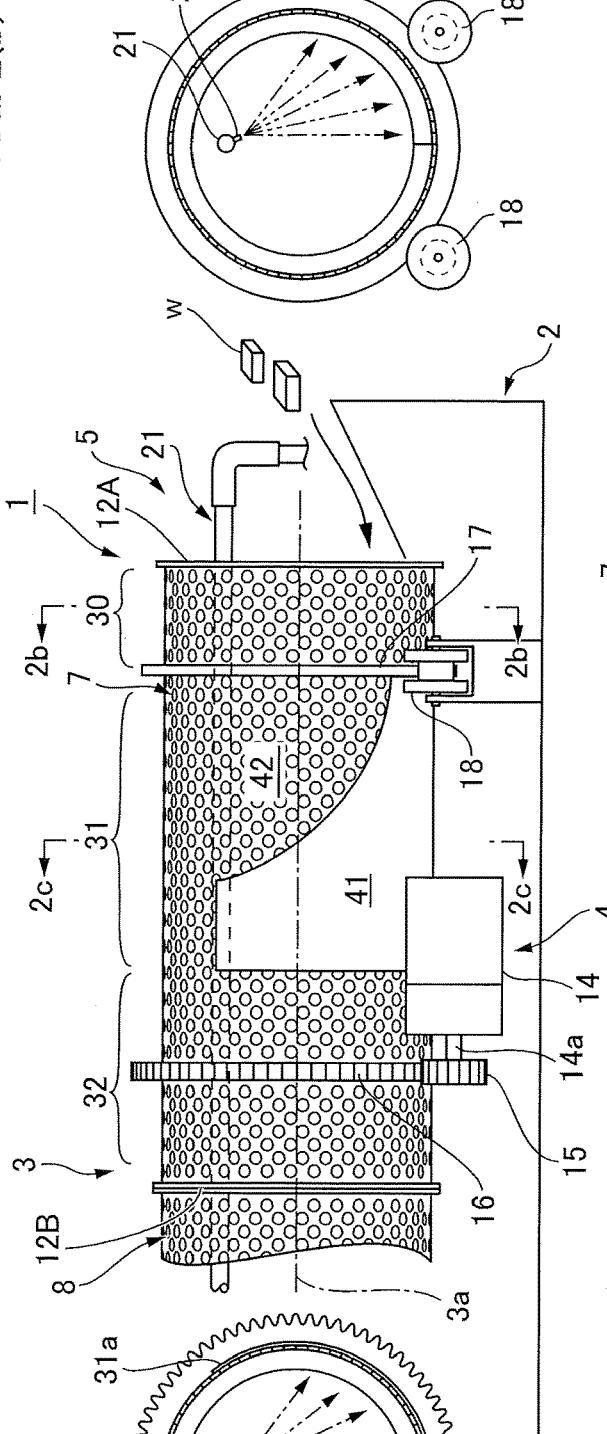
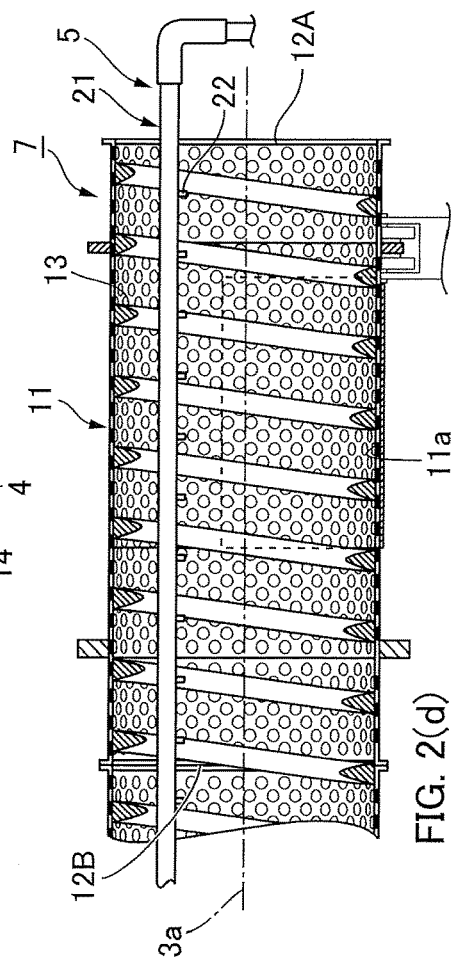

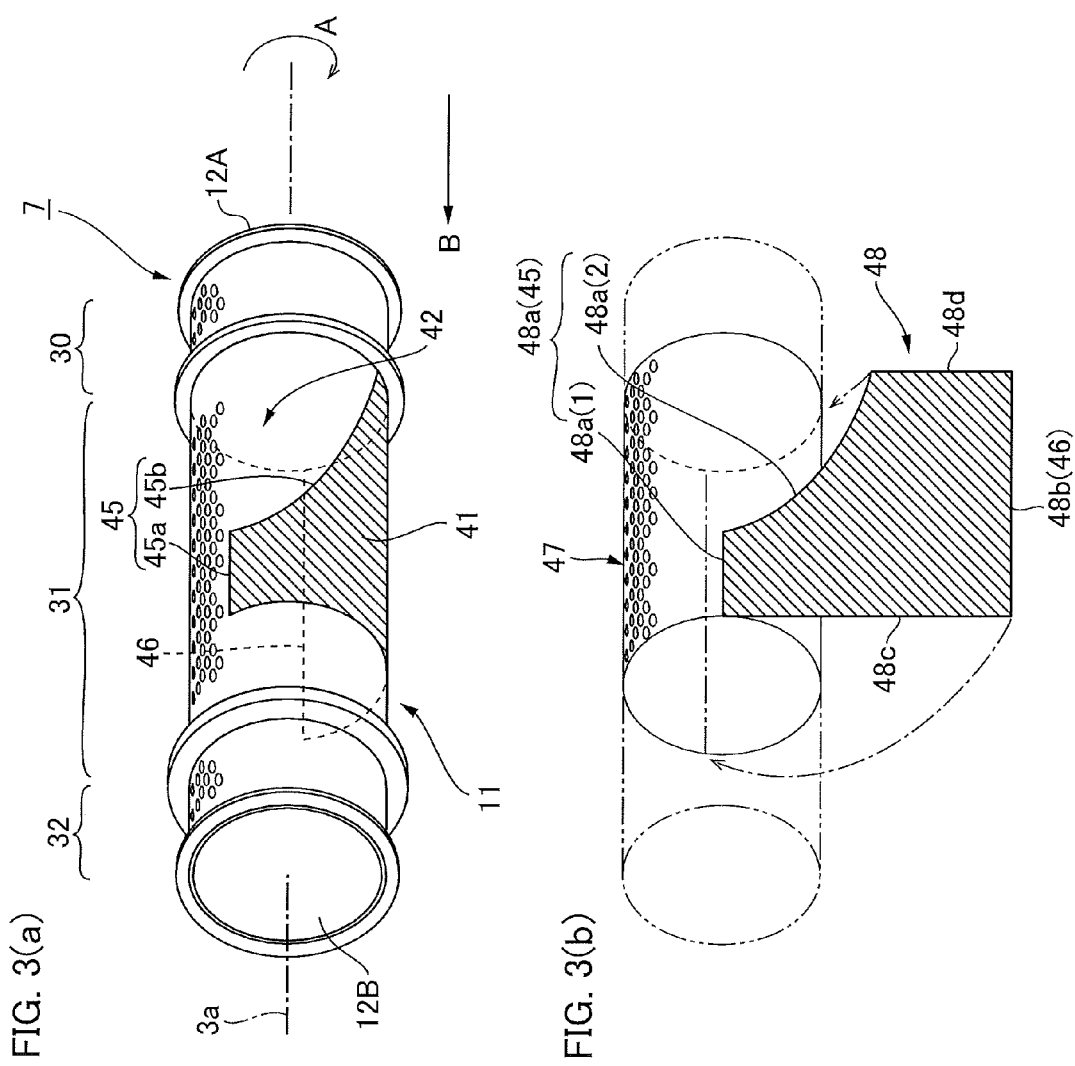

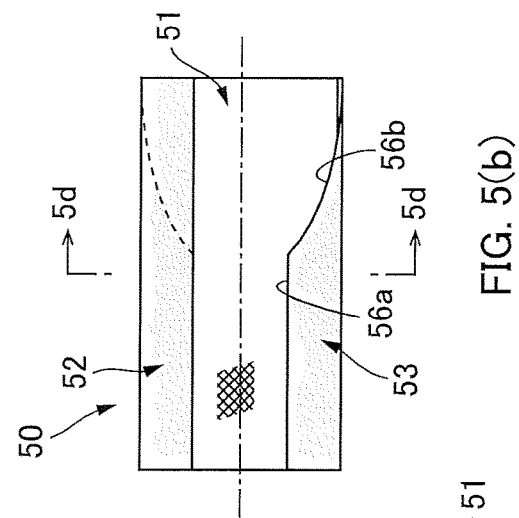
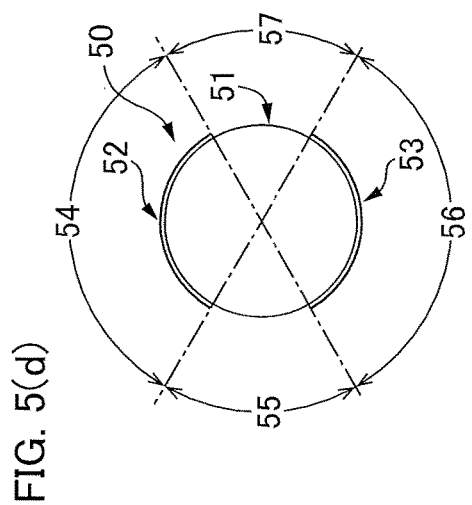
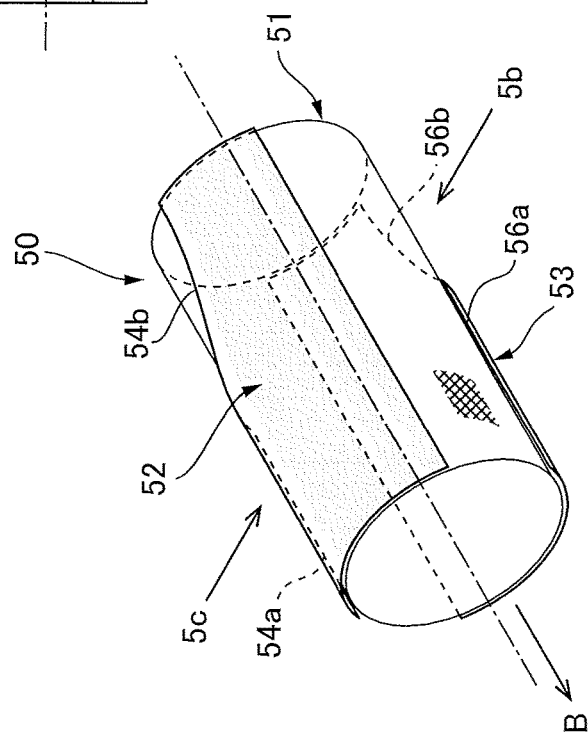
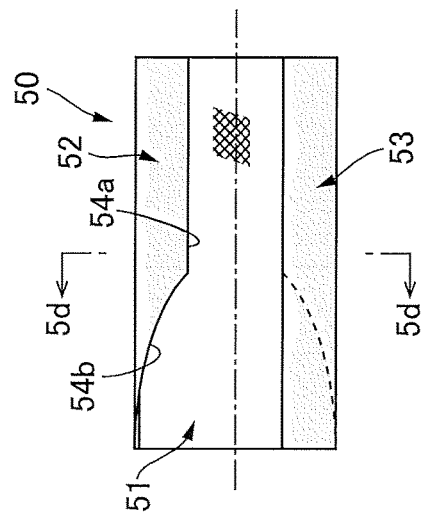
FIG. 5(b)
FIG. 5(d)
FIG. 5(a)
FIG. 5(c)

ROTATING DRUM FOR WORKPIECE CONVEYANCE AND WORKPIECE CLEANING DEVICE

TECHNICAL FIELD

The present invention relates to a rotating drum for workpiece conveyance in which a feed fin extends helically along the inner circumferential surface of a drum body, and to a workpiece cleaning device provided with the rotating drum for workpiece conveyance.

BACKGROUND ART

The rotating drum for workpiece conveyance of this type (hereinafter refer to simply as "rotating drum" in some cases) is used in a workpiece conveyance device for conveying a variety of workpieces such as metal machined articles, plastic molded articles, ceramics and other inorganic machined articles, rubber articles, earth and sand, and food products.

Patent documents 1 to 4 each disclose a workpiece washing device for washing workpieces in a rotating drum by spraying washing liquid to the workpieces being fed by a feed fin rotating integrally with the rotating drum. The feed fin extending helically along the inner circumferential surface of the rotating drum, is generally a plate-like fin which has a constant width and a constant height, and erects at a right angle from the inner circumferential surface of the rotating drum. Patent document 5 discloses a rotating drum for washing provided with a feed fin slightly inclined in the feed direction.

Workpieces, which are conveyed within the rotating drum, are positioned on the inner circumferential surface section located at the lowest part of the drum inner circumferential surface. When the rotating drum rotates once, the workpieces are caused to feed out in the direction of the drum center line by one pitch of the feed fin rotating integrally with the rotating drum.

The present inventors et al have proposed a rotating drum for use in a workpiece cleaning device, in which liquid passable portion and liquid impassable portion are formed along the circumferential direction in Patent document 6. In the workpiece cleaning device disclosed in this document, a workpiece inserted into the rotating drum is conveyed by the feed fin while the washing liquid is sprayed onto the workpiece. While the rotating drum rotates once, the workpiece is applied with three manners of washing; immersion washing, washing by running liquid, and shower washing. Hereinafter, this type of washing is called as a "triple washing."

In the triple washing, when the liquid impassable section moves to a lower side of the rotating drum, washing liquid is accumulated on the liquid impassable section and the workpiece becomes a state being immersed in the washing liquid, whereby the workpiece is primarily applied with immersion washing. In a state in which the lower side part of drum is gradually switched from the liquid impassable section to the liquid passable section with the rotation of the rotating drum, the washing liquid accumulated on the liquid impassable section flows out through the liquid passable section, and therefore the workpiece is primarily applied with washing by running liquid. In a state in which the liquid passable section is located at the lower side part of the drum, washing liquid is directly sprayed onto the workpiece, and shower washing is primarily performed on the workpiece.

PRIOR ART DOCUMENTS

Patent Documents

Patent Document 1: JP 2004-275819 A
Patent Document 2: JP 2001-129499 A
Patent Document 3: JP 2008-6364 A
Patent Document 4: JP 4557888 B
Patent Document 5: JP 4126704 B
Patent Document 6: WO2012/060047

SUMMARY OF THE INVENTION

Problems to be Solved by the Invention

The feed fin used in a conventional rotating drum has the following problems. The workpiece is sometimes trapped in the internal corner between the drum inner circumferential surface and the feed fin while the workpiece is conveyed by the feed fin. For example, in the case of plastic, rubber or other light-weight workpieces, the workpiece is nipped or stacked in the internal corner and is integrally rotated with the rotating drum, so that the workpiece is sometimes unable to be fed out. When a large amount of workpieces are inserted into and conveyed by the rotating drum, a plurality of workpieces are sometimes trapped between adjacent fin sections. These trapped workpieces are rotated integrally with the rotating drum, and are sometimes unable to be fed out.

The rotating drum, in which the liquid passable section and the liquid impassable section are formed along the drum circumferential surface for performing the triple washing, has the following problems. When the liquid impassable section is located at the drum lower side part of the rotating drum, there is a possibility that washing liquid accumulated on the liquid impassable section flows out into the downstream side of the workpiece conveyance direction. If washing liquid, which has been used for washing the workpieces and become dirty, flows into the downstream side of the workpiece conveyance direction within the rotating drum, the workpiece is washed by the dirty washing liquid, which causes to lower the washing efficiency. As a countermeasure, it is considered to increase the height of the feed fin so as to prevent the washing liquid from flowing into the downstream side of the workpiece conveyance direction. However, if the height of the feed fin is increased, the washing efficiency is lowered, which is not preferable. Thus, it is preferable to control the direction of flow of washing liquid in the rotating drum without changing the height of the feed fin. In some cases, it is desired that the flow of washing liquid is controlled to direct from the upstream side to the downstream side of the workpiece conveyance direction.

An object of the present invention is to provide a rotating drum for workpiece conveyance, which is capable of preventing or limiting conveyance failure of workpieces by a helically-extending feed fin, and a workpiece cleaning device provided with the rotating drum for workpiece conveyance.

Another object of the present invention is to provide a rotating drum for workpiece conveyance capable of forming the flow of washing liquid from the downstream side to the upstream side of the workpiece conveyance direction, and a workpiece cleaning device provided with the rotating drum for workpiece conveyance.

Means of Solving the Problems

In order to solve the above problems, a rotating drum for workpiece conveyance of the present invention is characterized by having a drum body, and a feed fin attached on a drum inner circumferential surface of the drum body in a state of extending helically along the drum inner circumferential surface, wherein obtuse-angle internal corners are formed on both sides of the feed fin in a direction of a drum center line.

When cut along a plane including the drum center line, the angle θ of the internal corner can be set to be a value within the following range:

$$110° \leq \theta \leq 130°$$

The angle of the internal corner between the inner circumferential surface of the drum body and the feed fin in the rotating drum is set to be an obtuse angle, by which it is possible to prevent or limit workpieces being conveyed from trapping or stacking in the internal corner. Whereby, conveyance failure of workpieces can be avoided.

It is preferable that the feed fin is set to have a tapered shape so that it becomes thinner towards the height direction of the feed fin from the inner circumferential surface of the drum body. In other words, it is preferable that the interval between adjacent fin sections in the direction of the drum center line is set to gradually increase along the height direction of the feed fin. Whereby, it is possible to prevent or limit workpieces from being trapped between the adjacent fin sections and perform conveyance of workpieces reliably.

In the present invention, it is preferable that the feed fin is provided with a first side surface portion facing one side of the drum center line direction, a second side surface portion facing the other side of the drum center line direction, a top surface portion connecting the first and second side surface portions together, wherein the top surface portion defined by a convex curved surface. In conveying operation of workpieces, it is possible to prevent damage or other adverse effects on workpieces caused by a sharp tip portion of the feed fin.

The feed fin shaped to have the first and second side surface portions and the top surface portion of the convex curved surface can be a fin made of sheet metal which is manufactured by applying bending process to a flat metal sheet having a prescribed width. In this case, the bent portion of the flat metal sheet becomes to form the top surface portion of the convex curved surface. External surfaces of the left and right side-plate portions, which are bent in the direction approaching with each other about the bent portion, form the first and second side surface portions.

The sheet-metal feed fin formed by bending process has a moment of inertial of area which is large in all directions, and is therefore hard to bend. When the drum body is made from a porous metal plate, wire mesh or the like, there is a possibility that the strength of the drum body is not sufficient and is easy to deform. When the high rigid feed fin formed by bending process is attached by welding or other means to the inner circumferential surface of the drum body in a state of extending helically along the inner circumferential surface, the feed fin functions as a reinforcing rib for the drum body.

When the feed fin, which is helically bent, is attached along the inner circumferential surface of the drum body, the rigidity of the feed fin is high, and a gap may be formed partially between the feed fin and the drum inner circumferential surface. The workpiece being conveyed may be nipped in the gap. It is therefore desirable to seal the gap by inserting a plate member into the clearance formed between the first and second side plate portions of the feed fin and the inner circumferential surface of the drum body.

Alternatively, it is possible to seal the clearance by deforming the portion of the drum body located between the first and second side plate portions of the feed fin so that the portion is projected into between the first and second side plate portions.

The workpiece cleaning device of the present invention is characterized by having a transverse-mounted rotating drum, a drum rotating mechanism for rotating the rotating drum around the drum center line, and a washing mechanism for spraying washing liquid onto the workpiece being fed in the rotating drum by the feed fin arranged helically along the inner circumferential surface of the rotating drum, wherein the rotating drum is the above-constituted rotating drum for workpiece conveyance.

It is possible to prevent or limit workpieces from being trapped in the internal corner between the inner circumferential surface of the drum of the rotating drum and the feed fin, or between the adjacent fin sections of the feed fin. The workpieces are conveyed reliably without stagnating, whereby washing operation of the workpieces can be carried out efficiently.

The rotating drum used for the workpiece cleaning device can be constituted to have a drum body, and a feed fin attached to the drum inner circumferential surface in a state of extending helically along the drum inner circumferential surface of the drum body, wherein obtuse angle internal corners are formed on both sides in the drum center line direction of the feed fin between the feed fin and the drum inner circumferential surface, and wherein the drum body is provided with a liquid impassable section, and a liquid passable section made from a porous material, the liquid passable section being arranged adjacent to both sides of the liquid impassable section in the circumferential direction of the drum body.

In this case, where the boundary edges on both sides of the liquid impassable section to the liquid passable section in the circumferential direction are referred to as first and second boundary edges, at least one of the first and second boundary edges is preferably provided with an edge portion having a certain length from the upstream-side end thereof in the workpiece conveyance direction, the edge portion being an inclined edge portion which is inclined in a straight-line, a curved-line or a stepwise fashion with respect to the downstream direction of the workpiece conveyance direction.

The portions of the drum body where the liquid impassable section and the liquid passable section are formed, performs immerse washing, washing by running liquid, and shower washing on workpieces with the rotation of the rotating drum. Specifically, when the liquid impassable section of the drum body of the rotating drum is located at the drum lower-side position, washing liquid is accumulated on the liquid impassable section and the immerse washing is applied to the workpiece. When the liquid impassable section is replaced by the liquid passable section at the drum lower-side position according to the rotation of the rotating drum, the washing liquid accumulated on the liquid impassable section flows out through the liquid passable section. The workpiece is primarily applied with the washing by running liquid by the flow of washing liquid.

The first and second boundary edges of the liquid impassable section is formed at least partially with the inclined edge portion. When the inclined edge portion between the liquid impassable section and the liquid passable section passes through the drum lower-side position according to the rotation of the rotating drum, the liquid impassable section is gradually replaced by the liquid passable section. Or, the liquid passable section is gradually replaced by the liquid impassable section. Along with this, a flow in the drum center line direction is created in the washing liquid accumulated on the liquid impassable section. According to the inclination direction of the inclined edge portion, the direction of the flow of the washing liquid accumulated on the liquid impassable section can be directed not only to the circumferential direction but also to the upstream direction of the workpiece conveyance direction.

For example, the first boundary edge is formed with a first inclined edge portion as the inclined portion, in which the first inclined edge portion is inclined so that the region of the liquid impassable part increases from the upstream-side end towards the downstream side of the workpiece conveyance direction.

In this way, the first inclined edge portion of the first boundary of the liquid impassable section retreats gradually or in a stepwise fashion towards the downstream side of the workpiece conveyance direction according to the rotation of the rotating drum. Therefore, as the liquid impassable section moves upward from the drum lower-side position, the region of the liquid passable portion increases from the upstream side toward the downstream side of the workpiece conveyance direction. In other words, on the way of switching from the immerse washing to the washing by running liquid, the liquid passable section gradually increases from the upstream side toward the downstream side of the workpiece conveyance direction at the drum lower-side position.

With the rotation of the rotating drum, the washing liquid accumulated on the liquid impassable section flows out in the circumferential direction, and also flows out through the liquid passable portion which increases from the upstream side toward the downstream side. As a result, the flow toward the upstream side of the workpiece conveyance direction is created in the washing liquid. Therefore, washing liquid, which becomes dirty after used to wash the workpiece, is prevented or limited from flowing out into the downstream side of the workpiece conveyance direction.

Here, it is possible to provide the second boundary edge with a second inclined edge portion as the inclined edge portion, wherein the second inclined edge portion is inclined in the direction opposite to the first inclined edge portion so that the region of the liquid impassable part increases from the upstream-side end toward the downstream side of the workpiece conveyance direction of the second inclined edge portion.

In this way, when the second inclined edge portion passes through the drum lower-side position, the liquid impassable portion gradually increases from the downstream side toward the upstream side of the workpiece conveyance direction from the time before the liquid impassable portion reaches the drum lower-side position and the immerse washing for workpieces begins. Accordingly, washing liquid is gradually accumulated on the liquid impassable portions while it flows out into the upstream-side liquid passable portion. Namely, the washing liquid is accumulated on the liquid impassable portion while flowing toward the upstream side. when the liquid impassable portion passes through the drum lower-side position, the liquid passable portion increases gradually from the upstream side toward the downstream side of the workpiece conveyance direction and the washing liquid flows out from the liquid passable portion as mentioned above, so that a flow from the downstream side toward the upstream side is formed in the washing liquid. Since the flow of washing liquid toward the upstream side is formed at the beginning of the immerse washing, the dirty washing liquid can be reliably prevented from flowing out into the downstream side.

When the liquid impassable portion is completely switched to the liquid passable portion at the drum lower-side position, washing liquid is directly sprayed onto the workpiece on the liquid passable portion. That is, the workpiece is mainly applied with the shower washing by the washing liquid. In this way, while the rotating drum rotates once, the triple washing (the immerse washing, the washing by running liquid, and the shower washing) is performed. The triple washing is repeatedly carried out while the workpiece passes through the drum body.

As mentioned above, the flow of washing liquid from the downstream side toward the upstream side of the workpiece conveyance direction is formed by means that the inclined edge portion of the liquid impassable section passes through the drum lower-side position. For the purpose that the flow of washing liquid is formed in a reliable manner, it is desirable that the height of the feed fin from the inner circumferential surface of the drum body is set to be gradually lowered from the downstream side toward the upstream side of the workpiece conveyance direction.

The drum body can be constituted by a cylinder made from a porous material, and a plate member attached to the cylinder in a state of covering a part of the outer or inner circumferential surface of the cylinder. In this case, the liquid impassable section is defined by a covered portion of the cylinder where the cylinder is covered by the plate member, while the liquid passable section is defined by a cylinder exposed portion where the cylinder is not covered by the plate member.

The cylinder is formed from a punched metal or other porous metal plate, and a metal plate is wrapped around a necessary portion of the outer circumferential surface of the cylinder, whereby easily obtaining the drum body for performing the triple washing. In addition, the shape of the edge of the wrapped metal plate is properly set, whereby easily controlling the flow of washing liquid.

BRIEF DESCRIPTION OF THE DRAWINGS

FIGS. 2(a)-2(d) include a side view showing the main portion of the workpiece cleaning device of FIG. 1, a lateral cross-sectional view thereof, a lateral cross-sectional view at another position thereof, and a longitudinal cross-sectional view thereof;

FIGS. 3(a)-3(d) include a perspective view showing a rotating drum for washing, an explanatory view showing the structure of the rotating drum, and an explanatory view showing another example of a metal plate used to manufacture the rotating drum;

FIGS. 5(a)-5(d) include a perspective view showing another structural example of the circular cylindrical body of the rotating drum, a side view from one side thereof, a side view from the other side thereof and a sectional view thereof;

MODE FOR CARRYING OUT THE INVENTION

With reference to the drawings, an embodiment of a rotating drum-type workpiece cleaning device according to the present invention is described hereafter.

(Overall Structure)

Figure 1:
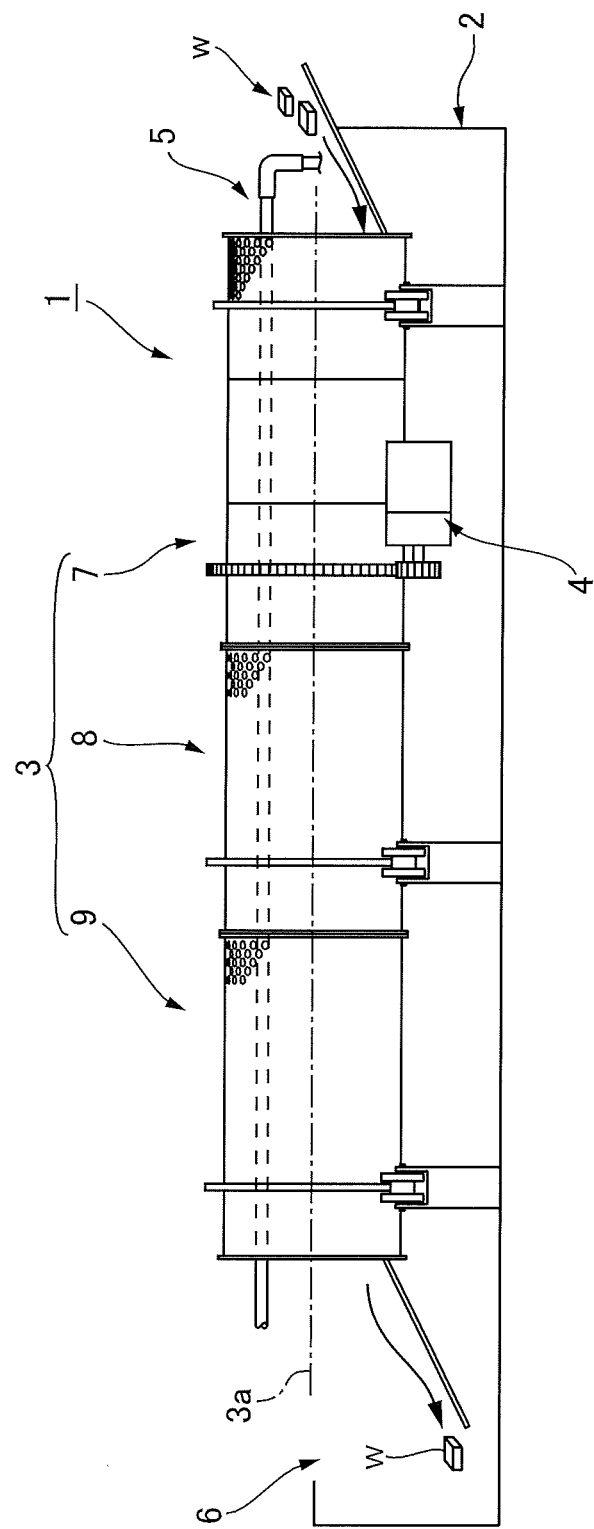
FIG. 1 is an overall schematic view of a workpiece cleaning device according to the present invention.

FIG. 1 is an overall schematic view of a workpiece cleaning device according to the present embodiment. The workpiece cleaning device 1 is a multi-tank in-line cleaning device for washing workpieces w such as a metal machined component manufactured by pressing or the like, for example, as an object to be washed. The workpiece cleaning device 1 is provided with a rotating drum unit 3 mounted on a device stand 2 in a transverse-mounted condition (which includes slightly inclined-mounted conditions), a drum rotating mechanism 4 for driving to rotate the rotating drum unit 3, a washing mechanism 5 for washing the workpiece w by spraying washing liquid thereon, a drying mechanism (not shown) for drying the workpiece w after being washed, a collecting section 6 for collecting the workpiece w after being washed and dried, and other sections.

The rotating drum unit 3 is a traverse-mounted rotating drum unit in which a rotating drum 7 for washing, a rotating drum 8 for rinse washing, and a rotating drum 9 for drying are connected in tandem as rotating drums for conveying workpieces. The rotating drum unit 3 is arranged so that the center axis line 3a thereof is horizontal.

FIG. 2(a) is a side view showing the main portion of the workpiece cleaning device 1, FIG. 2(b) is a lateral cross-sectional view showing a portion thereof cut along line 2b-2b, FIG. 2(c) is a lateral cross-sectional view showing a portion thereof cut along line 2c-2c, and FIG. 2(d) is a longitudinal cross-sectional view thereof.

The rotating drum 7 for washing is provided with a circular cylindrical drum body 11, the distal end of the drum body 11 constitutes a workpiece inlet 12A, and the rear end thereof constitutes a workpiece outlet 12B. The outlet 12B of the drum body 11 is connected to the rotating drum 8 for rinse washing. The workpiece conveyance direction is the direction from the workpiece inlet 12A to the workpiece outlet 12B along the drum center axis line 3a.

The circular inner circumferential surface 11a of the drum body 11 is attached a feed fin 13 extending helically at a constant pitch along the direction of the drum center axis line 3a. The feed fin 13 is a fin that has a prescribed height and erects from the circular inner circumferential surface 11a of the drum body 11. In this example, the fin height from the inner circumferential surface 11a of the rotating drum 7 is set so that it is gradually lowered from the downstream side (the workpiece outlet 12B side) toward the upstream side (the workpiece inlet 12A side) of the workpiece conveyance direction along the drum center axis line 3a.

The drum rotating mechanism 4 is arranged in a section at the side of the workpiece outlet 12B of the drum body 11. The drum rotating mechanism 4 is provided with a motor, a rotating actuator 14 having a speed reduction gear, a drive gear 15 fixed on the rotating shaft 14 of the actuator, a driven gear 16 fixed on the outer circumferential surface of the drum body 11, and other components. The drive gear 15 meshes with the driven gear 16.

An annular rib 17 is fixed on the outer circumferential surface at the side of the workpiece inlet 12A of the drum body 11, and is supported by a pair of left and right supporting rollers 18. The rotating actuator 14 is driven to rotate the rotating drum unit 3 including the rotating drum 7 around the drum center axis line 3a.

The workpiece washing mechanism 6 is provided with a washing liquid supply tube 21. The washing liquid supply tube 21 is arranged inside the rotating drum 7 in a state of extending parallel the drum center axis line 3a, and washing liquid spray nozzles 22 are attached to the washing liquid supply tube at fixed intervals along the length direction thereof. The washing liquid spray nozzles 22 are designed so as to spray washing liquid out at a downward and inclined direction.

The drum body 11 of the rotating drum 7 is provided with an upstream-side cylindrical body section 30 located at the side of the workpiece inlet 12A, a cylindrical boy section 31 located in the middle, and a downstream-side cylindrical body section 32 located at the side of the workpiece outlet 12B. The upstream-side cylindrical body section 30 is a portion where shower washing is performed, the middle cylindrical body section 31 is a portion where triple washing (immerse washing, washing by running liquid, and shower washing) is performed, and the downstream-side cylindrical body section 32 is a portion where shower washing is performed.

When viewed along the circumferential direction, the middle cylindrical body section 31 is provided with a liquid impassable section 41 defined by a metal plate 31b that does not allow passage of the washing liquid, and a liquid passable section 42 defined by a punched metal 31b that dose allow passage of the washing liquid, as shown in FIGS. 2(a) and 2(c). The front-side upstream-side cylindrical body section 30 and the rear-side downstream-side cylindrical body section 32 are respectively liquid passable cylindrical body sections defined by a punched metal, as a whole.

The rotating drum 8 for rinse washing is, for example, provided with a cylindrical body section made from a punched metal. A feed fin, which extends helically along the inner circumferential surface of the cylindrical body section, has a shape similar to the feed fin 13 arranged in the rotating drum 7 for washing. Likewise, the rotating drum 9 for drying is also provided with a cylindrical body section made from a punched metal and a feed fin that is arranged on the inner circumferential surface of the cylindrical body section and has a shape similar to the feed fin 13, for example. A drying hot air is supplied inside the rotating drum 9 from a not-shown drying mechanism, for example.

(Rotating Drum)

FIG. 3(a) is a perspective view showing the rotating drum 7 for washing, FIG. 3(b) is an explanatory view showing cylindrical body and a metal plate constituting the cylindrical body part 31 thereof, and FIGS. 3(c) and 3(d) are explanatory views showing another two examples of the metal plate.

The cylindrical body part 31 of the drum body 11 in the rotating drum 7 is provided with the liquid impassable section 41 that does not allow to pass washing liquid and the liquid passable section 42 that allows to pass washing liquid, as mentioned before. The both sides of the liquid impassable section 41 in the circumferential direction of the drum body 11 constitute boundary edges to the liquid passable section 42. The boundary edge at the rear side of the liquid impassable section 41 in the drum rotational direction A is referred to as a first boundary edge 45, and the other boundary edge at the front side as a second boundary edge 46.

The first boundary edge 45 of the liquid impassable section 41 on the circumferential surface of the cylindrical body part 31 has an edge portion at the downstream side of the workpiece conveyance direction B, the edge portion being a straight-line edge portion 45a extending in the workpiece conveyance direction B (the direction along the drum center axis line 3a). The remaining edge portion continuing to the straight-line edge portion 45a and located at the upstream side of the workpiece conveyance direction B, is an inclined edge portion 45b (a first inclined edge portion) that extends in a concave curved-line fashion toward the side of the second boundary edge 46 and toward the upstream side of the workpiece conveyance direction B.

The rotating drum 7 having the cylindrical body part 31 can be manufactured in the following. As shown in FIG. 3(*b*), a cylindrical body 47 is manufactured from a porous first plate member, such as punched metal, metal mesh or other material, that allows to pass washing liquid. A second plate member, for example, a metal plate 48 is wound around the cylindrical body 47 in a state in which the outer circumferential surface of the cylindrical body 47 is partially covered by the metal plate 48 fixed to the cylindrical body 47. The liquid impassable section 41 is formed by a covered portion where the cylindrical body 41 is covered by the metal plate 48, and the liquid passable portion 42 is formed by an exposed portion where the porous first plate member constituting the cylindrical body 47 is exposed. It is of course that the metal plate 48 can be attached to the inner circumferential surface of the cylindrical body 47.

As shown in FIG. 3(*b*), the metal plate 48 has edges 48a(1) and 48a(2) respectively constituting the straight-line edge portion 45a and the inclined edge portion 45b of the first boundary edge 45, an edge 48b constituting the second boundary edge 46, and a pair of edges 48c and 48d that extend perpendicularly from both ends of the edge 48b and are connected to both ends of the edge 48a. The edge 48d is an upstream-side edge portion of the metal plate 48 in the workpiece conveyance direction B. In this example, the edges 48c and 48d are defined by straight lines extending in the direction perpendicular to the workpiece conveyance direction B (the direction along the drum center axis line 3a), respectively. The proportion of the liquid impassable section 41 and the liquid passable section 42 can be changed by adjusting the lengths of the edges 48c and 48d. For example, the portion of the metal plate 48 at the side of the longer edge 48c covers the cylindrical body 47 in the range of about 180 degrees to about 270 degrees in the circumferential direction.

FIGS. 3(*c*) and 3(*d*) show different shapes of the metal plate 48. In a metal plate 49 shown in FIG. 3(*c*), an edge 49a for defining the first boundary edge 45 is constituted by a straight-line edge portion 49a(1) for defining the straight-line edge portion 45a, and a linearly inclined edge portion 49a(1) for defining the inclined edge portion 45b. Likewise, an edge 49b thereof for defining the second boundary edge 46 is constituted by a straight-line edge portion 49b(1), and a linearly inclined edge portion 49b(2) (the second inclined edge portion). The inclined edge portion 49b(2) is inclined opposite to the inclined edge portion 49a(2). When the metal plate 49 is wound around the cylindrical body 47 instead of the metal plate 48, the second boundary edge 46 of the liquid impassable section 41 to the liquid passable section 42 is provided with an edge portion so that it moves forward to the upstream side of the workpiece conveyance direction B along the rotational direction of the rotating drum 7.

The inclined edge portion 45b of the first boundary edge 45 can be a curved line, a straight line, or a stepped shape as shown in FIG. 3(*d*). In either case, the edge portion can be shaped so that it moves backward to the downstream side of the workpiece conveyance direction B along the rotational direction of the rotating drum 7. Conversely, the inclined edge portion formed in the other second boundary edge 46 can be a curved line, a straight-line, or a stepped-shape edge portion so that it moves forward to the upstream side of the workpiece conveyance direction B along the rotational direction of the rotating drum 7.

(Workpiece Conveyance and Washing Operation by Rotating Drum)

Figure 4A:
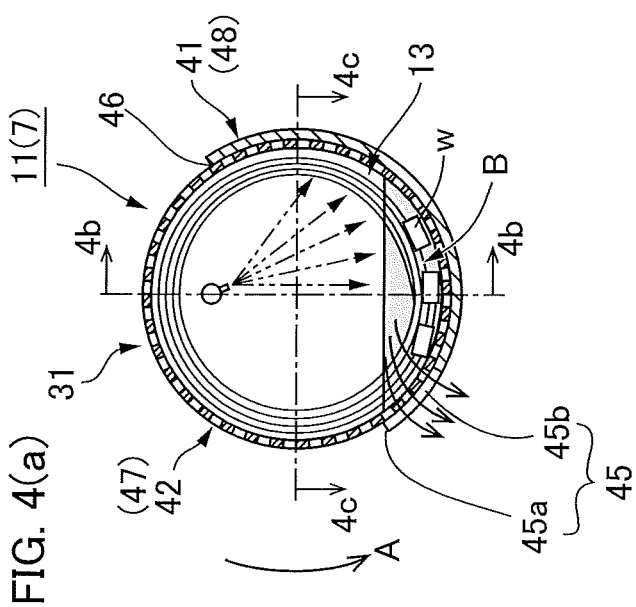
FIGS. 4(a)-4(c) include an explanatory view showing a lateral sectional view of the rotating drum during running-liquid washing, an explanatory view showing a longitudinal cross-section cut along line 4b-4b, and an explanatory view showing a longitudinal cross-section cut along line 4c-4c.
Figure 4B:
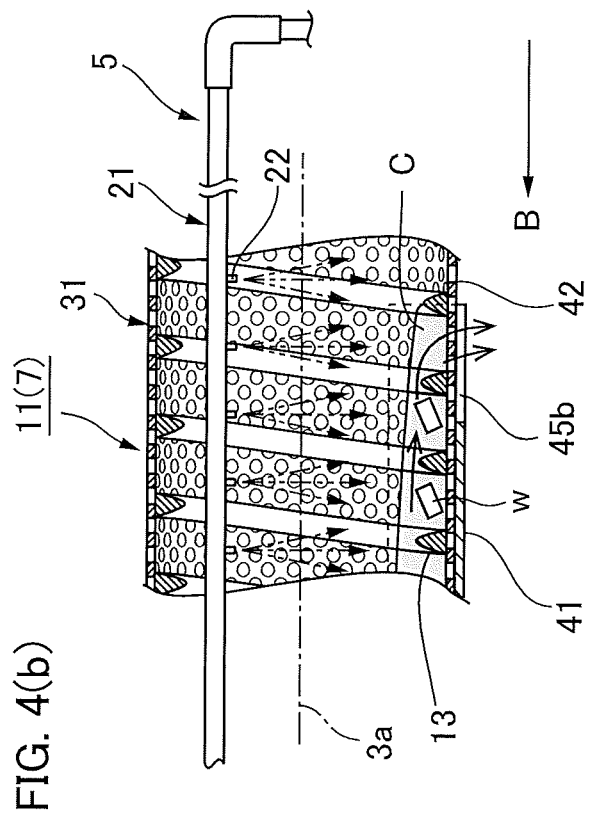
Figure 4C:
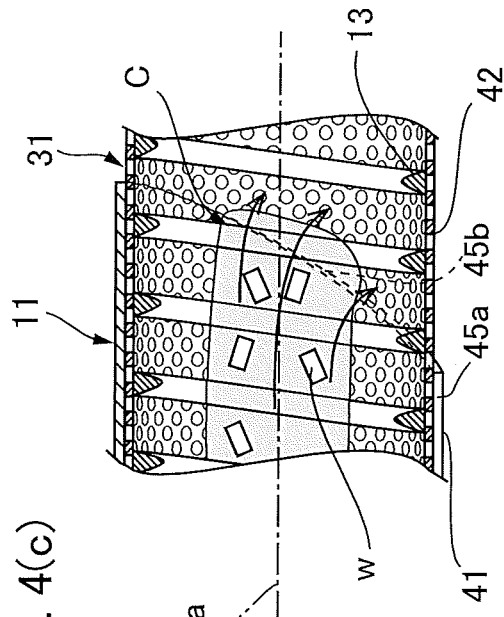

FIG. 4(*a*) is an explanatory view showing a lateral cross-section of the cylindrical body part 31 of the rotating drum 7, FIG. 4(*b*) is an explanatory view showing a longitudinal cross-section of a portion cut along line 4b-4b, and FIG. 4(*c*) is an explanatory view showing a longitudinal cross-section of a portion cut along line 4c-4c.

With reference to these drawings, workpiece conveyance and washing operation performed by the workpiece cleaning device 1 is described. The drum rotation mechanism 4 is driven to rotate the rotating drum unit 3, and washing liquid is sprayed out from the washing liquid spray nozzles 22 of the workpiece washing mechanism 5. In this state, workpieces w to be washed are supplied through the workpiece inlet 12A.

The workpiece w, which is supplied to the front-side rotating drum 7 of the rotating drum unit 3, is conveyed over the lower-side inner circumferential surface portion of the drum body 11 of the rotating drum 7 (a drum lower-side position) in the workpiece conveyance direction B along the drum center axis line 3a by means of the feed fin 13 that extends helically. The washing liquid, which is ejected from the washing liquid spray nozzles, is sprayed toward the lower-side inner circumferential surface portion of the drum body 11, and flows down to the lowest position of the lower-side inner circumferential surface portion.

The workpiece w is held in position slightly farther along the rotational direction of the rotating drum than the lowest position in the lower-side inner circumferential surface portion of the drum body 11 of the rotating drum 7. In response to this, the washing liquid spray direction of the washing liquid spray nozzles 22 is set, as a whole, to be slightly inclined from being vertical toward the rotational direction of the rotating drum 7.

Because the upstream-side cylindrical body part 30 on the workpiece inlet 12A side of the rotating drum 7 is formed from punched metal, washing liquid does not accumulate in the lower-side inner circumferential surface portion but instead flows downward. Therefore, the washing liquid is sprayed directly onto the workpiece w conveyed by the feed fin 13, adhering impurities and the like are washed off by the washing liquid, and the impurities fall out along the washing liquid.

As shown in FIG. 4(*a*), about a half portion of the cylindrical body part 31 in the circumferential direction is the liquid impassable section 41 formed from the metal plate 48, and the remaining portion thereof is the liquid passable section 42. Consequently, with the rotation of the rotating drum 7, the inner circumferential surface portion at the drum lower-side position is switched alternately between the liquid impassable portion 41 and the liquid passable portion 42.

In a rotating state in which the liquid impassable portion 41 is located at the drum lower-side position, the workpiece w is primarily immersion washed. In a rotating state in which the liquid passable portion 42 is located at the drum lower-side position, the workpiece w is primarily shower washed. During transition from the liquid impassable portion 41 to the liquid passable portion 42, the workpiece w is primarily washed by running liquid.

The inclined edge portion 45*b* is formed in the first boundary edge 45 of the liquid impassable portion 41. The inclined edge portion 45*b* passes through the drum lower-side position with the rotation of the rotating drum 7, and, when viewed at the drum lower-side position, the inclined edge portion 45*b* moves from the upstream side toward the downstream side of the workpiece conveyance direction. Accordingly, the liquid passable section 42 located at the drum lower-side position gradually increases from the upstream side toward the downstream side of the workpiece conveyance direction.

As shown in FIGS. 4(*b*) and 4(*c*), from the middle of the immerse washing, the liquid passable section 42 gradually increases from the upstream side to the downstream side of the workpiece conveyance direction at the drum lower-side position, the washing liquid starts to flow out of the liquid passable section 42, and the amount of washing liquid flowing out of the liquid passable section gradually increases. Therefore, a flow of washing liquid toward the upstream side of the workpiece conveyance direction, as a whole, is formed in the washing liquid C accumulated in the liquid impassable section 41. As a result, the washing liquid C, which becomes dirt after workpiece washing, can be prevented or limited from flowing into the downstream side of the workpiece conveyance direction B.

In addition, the fin height of the feed fin 13 is gradually lowered from the downstream side to the upstream side of the workpiece conveyance direction. Consequently, the flow of washing liquid toward the upstream side of the workpiece conveyance direction b is smoothly formed. It is possible to prevent or limit dirty washing liquid from flowing into the downstream-side section from the upstream-side section in a reliable manner.

The workpiece after being subjected to the triple washing in the cylindrical body part 31 is fed into the downstream-side cylindrical body part 32. The workpiece w is shower washed during passing through the downstream-side cylindrical body part 32. The workpiece w after being washed by washing liquid is fed into the rotating drum 8 for rinse washing of the next stage, and is subjected to rinse washing. Thereafter, the workpiece w is fed into the rotating drum 9 for drying and is subjected to drying, and then is collected in the collection part 6.

(Another Example of Cylindrical Body Part)

FIG. 5(*a*) is a perspective view showing another constitutional example of the cylindrical body part 31 of the rotating drum 7, FIG. 5(*b*) is a side view thereof when viewed from the side of arrow 5*b*, FIG. 5(*c*) is a side view thereof when viewed from the side of arrow 5*c*, and FIG. 5(*d*) is a cross sectional view thereof cut along line 5*d*-5*d*.

A cylindrical body part 50 of this example is constituted by a cylinder 51 formed from punched metal, and two metal plates 52 and 53 which have the same shape and are attached to the outer circumferential surface of the cylinder 51. The metal plates 52 and 53 are arranged in a rotationally symmetrical state about the center of the cylinder 51. These two metal plates 52 and 53 provide the outer circumferential surface of the cylinder 51 with a first liquid impassable portion 54, a first liquid passable portion 55, a second liquid impassable portion 56, and a second liquid passable portion 57 in this order. Accordingly, the triple washing is performed to the same workpiece twice while the cylindrical body part 50 rotates once.

First edge portions 54*a* and 56*a* of the first and second liquid impassable portions 54 and 56 are formed to have edge portions, in this example, inclined edge portions 54*b* and 56*b* that are shaped so as to move backward toward the downstream side of the workpiece conveyance direction B along the rotational direction of the cylindrical body part 50. With these inclined edge portions 54*b* and 56*b*, the flow of washing liquid directed from the downstream side toward the upstream side of the workpiece conveyance direction B is formed, whereby dirty washing liquid after workpiece washing is prevented or limited from flowing into the downstream side of the workpiece conveyance direction B.

Incidentally, in the above-mentioned examples, the inclined edge portions 45*b*, 54*b* and 56*b* inclined to the same direction are formed in the liquid impassable sections 41, 54 and 56. In cases in which the inclination orientation of these inclined edge portions is reversed, it is possible to form the flow of washing liquid directed from the upstream side to the downstream side of the workpiece conveyance direction with the rotation of the rotating drum. Thus, the flow of washing liquid can be controlled by changing the inclination orientation of the inclined edge portions.

(Feed Fin)

Figure 6A:
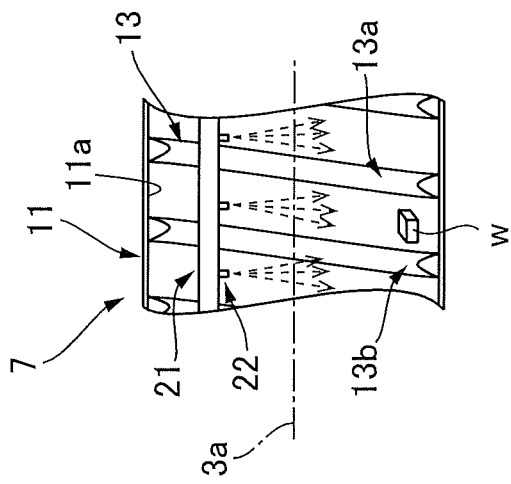
FIGS. 6(a) and 6(b) are explanatory views showing a feed fin.
Figure 6B:
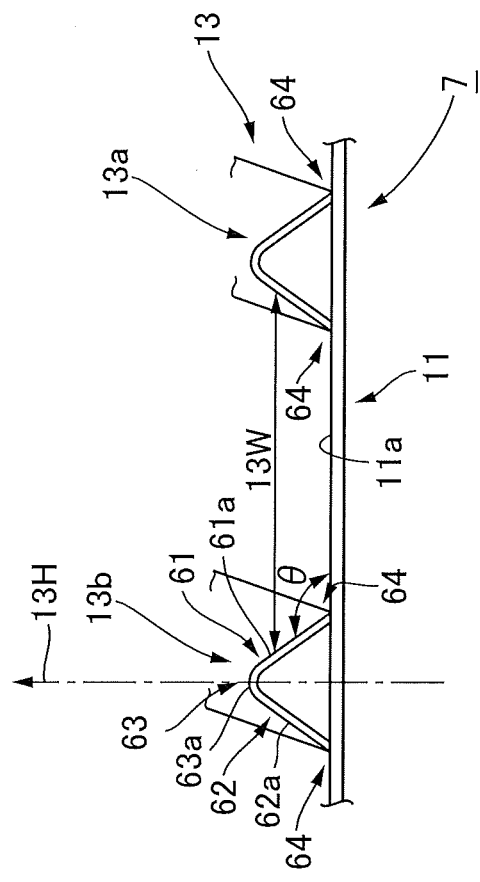

FIG. 6(*a*) is an explanatory view showing the feed fin 13 attached to the inner circumferential surface 11*a* of the drum body 11 in the rotating drum 7, and FIG. 6(*b*) is an explanatory view showing a pair of adjacent fin portions.

The feed fin 13 of this example is a fin made of sheet metal. Specifically, the feed fin 13 is formed by bending a long metal flat plate having a prescribed width, to have a mountain shape provided with left and right side-plate portions 61 and 62 of the same width, and top part connecting tip portions of the side plate portions. The top surface portion 63*a* of the top part 63 is defined by a convex curve, for example, a convex circular arc surface. The left and right side-plate portions 61 and 62 form an angle of about 60 degrees, and the outer side surface portion 61*a* and 62*a* thereof are defined by a flat plane and are smoothly connected to the top surface portion 63*a*. The feed fin 13 is fixed on the inner circumferential surface 11*a* of the drum body 11 by welding or other fixing means.

In a state in which the feed fin 13 is fixed on the inner circumferential surface 11*a* of the drum body 11, the internal corner 64, which is formed between the both sides of the feed fin 13 and the inner circumferential surface 11*a*, has an angle of about 120 degrees, or an obtuse angle. Specifically, when cut along a plane including the drum center axis line 3*a* which is the workpiece conveyance direction, the angle θ formed between the one side surface portion 61*a* and the inner circumferential surface 11*a* and that formed between the other side surface portion 62*a* and the inner circumferential surface are set to be an obtuse angle.

The workpiece w to be conveyed is prevented or limited from being trapped into or adhered to the internal corner 64 by setting the angle of the internal corner to be an obtuse angle. In this way, the conveyance failure of workpieces can be avoided, and lack of cleaning or other adverse effects due to the conveyance failure can also be avoided. Although the angle θ of the internal corner 64 is about 120 degrees in this example, it can be in the range of about 110 degrees to about 130 degrees. It is of course that an angle outside the above range can also be adopted.

To explain further, the feed fin 13 of the present invention is shaped so as to form roughly an equilateral triangle when attached to the inner circumferential surface 11*a*. The feed fin 13 has a tapered shape along the height direction thereof. As a result, the fin interval 13W, which is formed between the adjacent fin portions 13a and 13b of the feed fin 13 in the direction of the drum center axis line 3a, is gradually increased from the inner circumferential surface 11a along the fin height direction 13H.

Different from a case in which the interval between the fin portions 13a and 13b is constant in the fin height direction 13H, the workpiece w can be prevented or limited from being trapped between the adjacent fin portions 13a and 13b. In particular, it is suitable when a large number of workpieces are conveyed. In this way, workpieces can be conveyed reliably. Although the side surface portions of the feed fin 13 on both sides of the workpiece conveyance direction are a flat surface in this example, they can be a convex curved surface or a concave curved surface. In this case as well, the state can be made in which the fin interval 13W is gradually increased along the fin height direction 13H from the inner circumferential surface 11a.

The feed fin 13 has the top part 63 bent into a circular arc shape by bending process, and the top part 63 has the top surface portion 63a of a circular arc shape. It is possible to prevent the workpiece w from being damaged by the sharp tip end portion of the feed fin 13.

When the drum body 11 of the rotating drum 7 is formed from metal sheet such as punched metal, it tends to deform in many cases because of insufficient strength thereof. The feed fin 13, which is formed by bending metal sheet, has a high moment of inertial of area and is not easy to bend in comparison with a plate fin having a fixed thickness. Because the high rigid feed fin 13 is attached by welding or the like to the inner circumferential surface 11a of the drum body 11 in a state of extending helically along the inner circumferential surface, the feed fin 13 functions as a reinforcing rib of the drum body 11. Accordingly, it is possible to obtain the rotating drum having a sufficient strength.

The feed fin 13 made of metal sheet is used in this example. For example, a liner member of triangular cross section, which is made from metal, plastics or other material, can be used as the feed fin.

(Another Example of Feed-Fin Fixing Means)

Figure 7:
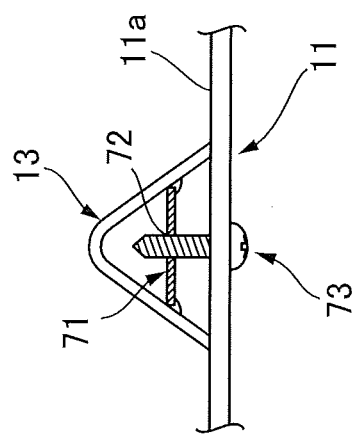
FIG. 7 is an explanatory view showing an example of fixing the feed fin.

FIG. 7 is an explanatory view showing another means of fixing the feed fin 13 on the inner circumferential surface 11a of the drum body 11. In the example shown in this drawing, a fastening plate 71 is attached by welding or other means in the feed fin 13 at a constant interval in the length direction of the feed fin. The fastening plate 71 is formed with a screw hole 72. A fastening screw 73 is threaded into and fixed to each screw hole 72 through the drum body 11 from the outer circumferential side of the drum body 11.

(Means for Sealing Gap Between Feed Fin and Inner Circumferential Surface of Cylindrical Body Part)

The feed fin 13 made of metal sheet is manufactured by bending a metal flat plate of a prescribed width along the width direction, and is bent into a helical shape along the length direction. In addition, the feed fin 13 is formed to have a mountain shape opening toward the inner circumferential surface 11a of the drum body 11, the mountain shape being defined by the left and right side plate portions 61 and 62 of the same width, and the top part 63 connecting the tip end of these side plate portions.

Since the feed fin 13 is high in sectional rigidity, when attached to the inner circumferential surface 11a of the drum body 11, gap is formed between the feed fin and the inner circumferential surface 11a along the length direction of the feed fin in many cases. If the gap is formed, the workpiece w to be conveyed is nipped in the gap and stayed there.

Figure 8A:
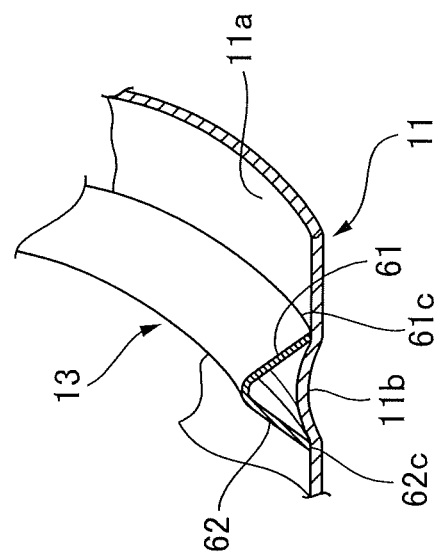
FIGS. 8(a) and 8(b) are explanatory views showing two examples for sealing the clearance between the feed fin and the inner circumferential surface of the rotating drum.

As shown in FIG. 8(a), it is desirable that a plate member 82 is inserted into and fixed to the gap 81 between the feed fin 13 and the inner circumferential surface 11a of the drum body 11, so that the gap 81 is sealed.

Figure 8B:
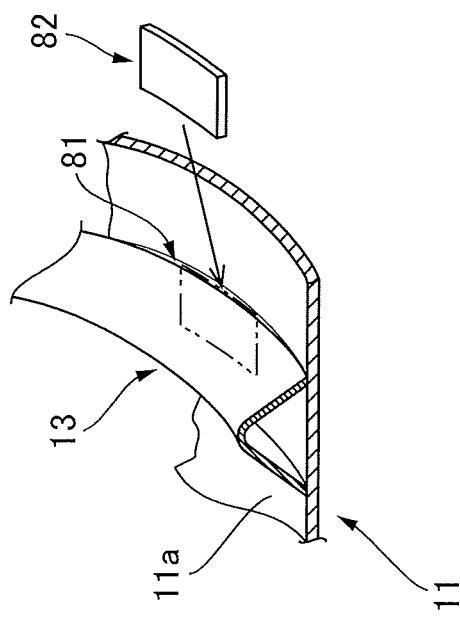

Alternatively, as shown in FIG. 8(b), a portion of the drum body 11, which is located between the tips 61c and 62c of the side plate portions 61 and 62 of the feed fin 13, is deformed so that the gap 81 is not formed. For example, as shown in the drawing, the portion 11b of the drum body 11 between the side plate portions 61 and 62 is protruded in a circular arc shape toward the inner side along the length direction of the feed fin 13. In this way, it is possible to prevent the formation of gap between the side plate portions 61 and 62, and the inner circumferential surface 11a of the drum body 11.

(Hole Shape of Liquid Passable Section)

The liquid passable portion in the rotating drum 7 is constituted by the cylinder formed from punched metal. The punched metal is usually formed with circular holes at a prescribed pitch.

Punched metal or porous material formed with oval holes instead of circular holes can be used to manufacture the cylinder.

In press working, long and narrow cutting chips are usually generated and are adhered on workpieces in same cases. In this case, if the long and narrow cutting chips are longer than the diameter of the circular holes and do not pass through the circular holes, they cannot be discharged from the rotating drum. These long and narrow cutting chips can be discharged from the rotating drum by forming oval holes and setting the major axis dimension thereof to allow the generated cutting chips to pass through.

According to experiments conducted by the present inventors et al, it is confirmed that it is desirable for the liquid passable section to be formed so that elongated holes such as elliptical holes, which are long in the direction perpendicular to the workpiece conveyance direction, are arranged. Specifically, in comparison with a case in which elongated holes are arranged so that the length direction of the elongated holes is inclined by 45 degrees with respect to the direction parallel to the workpiece conveyance direction, it is confirmed that long and narrow cutting chips can be discharged from the rotating drum effectively in a case in which the length direction of the elongated holes is oriented in the direction perpendicular to the workpiece conveyance direction.

OTHER EMBODIMENTS

The above-mentioned example is directed to a workpiece cleaning device using a rotating drum for workpiece conveyance. The rotating drum for workpiece conveyance is not limited to the purpose of conveying workpieces to be cleaned, but also can be used for conveying a variety of articles such as for conveying earth and sand, food products or the like. As a rotating drum used in these cases, the rotating drum 7 used in the above example can be used as it is. When the liquid passable section and the liquid impassable section are not needed, the rotating drum can be constituted by a metal cylinder, and the feed fin 13 can be attached to the inner circumferential surface thereto. Alternatively, the rotating drum can be constituted by a cylinder formed from punched metal, metal mesh or other material, and the feed fin 13 can be attached to the inner circumferential surface thereto.

In addition, the above-mentioned drum is provided with the feed fin, by which the obtuse-angle internal corners are formed. In a conventional rotating drum provided with a plate-like feed fin which has a fixed width and a fixed height and erects perpendicularly from the inner circumferential surface, it is possible that the liquid passable section and the liquid impassable section are formed alternately in the circumferential direction of the rotating drum, and the inclined edge portion is formed on the boundary portion therebetween, as mentioned above. In this case, it is also possible to control the flow of washing liquid so that the flow is directed toward the upstream side from the downstream side of the workpiece conveyance direction, or is directed toward the downstream side from the upstream side by changing the inclination direction of the inclined edge portion.

The invention claimed is:

1. A workpiece cleaning device comprising:
a rotating drum arranged in a transverse state;
a drum rotating mechanism for rotating the rotating drum about a drum center axis; and
a washing mechanism for spraying washing liquid onto a workpiece fed by a feed fin to wash the workpiece,
wherein the rotating drum has:
a drum body; and
a feed fin attached to a drum inner circumferential surface of the drum body in a state of extending helically along the drum inner circumferential surface; and
wherein the drum body has a liquid impassable section, and liquid passable sections formed from porous material, the liquid passable sections being arranged adjacent to both sides of the liquid impassable section in a circumferential direction of the drum body, and
where boundary edges of the liquid impassable portion on both sides to the liquid passable section in the circumferential direction are referred to as first and second boundary edges, respectively,
at least one of the first and second boundary edges has at least an edge portion of a prescribed length measured from an upstream-side end thereof in a workpiece conveyance direction, the edge portion being an inclined edge portion inclined in a straight-line fashion, curved-line fashion or stepwise fashion with respect to a downstream direction of the workpiece conveyance direction.

2. The workpiece cleaning device according to claim 1, wherein, when viewed along a rotational direction of the rotating drum,
the first boundary edge is a rear side boundary edge of the liquid impassable section in the rotational direction,
the first boundary edge is provided with a first inclined edge portion as the inclined edge portion, and
the first inclined edge portion is inclined in a direction so that an area of the liquid impassable section is increased from an upstream-side end of the first inclined edge portion toward a downstream side in the workpiece conveyance direction.

3. The workpiece cleaning device according to claim 2, wherein the second boundary edge is provided with a second inclined edge portion as the inclined edge portion,
the second inclined edge portion is inclined in a direction opposite to the first inclined edge portion so that the area of the liquid impassable section is increased from the upstream side end of the second inclined edge portion toward the downstream side in the workpiece conveyance direction.

4. The workpiece cleaning device according to claim 2, a fin height of the feed fin from the drum inner circumferential surface of the drum body is gradually lowered from the downstream side to the upstream side of the workpiece conveyance direction.

5. The workpiece cleaning device according to claim 1, wherein a portion of the drum body where the liquid impassable portion and the liquid passable portion are formed is a portion where immersion washing, washing by running water and shower washing are performed to the workpiece by at least once during one rotation of the rotating drum for workpiece conveyance.

6. The workpiece cleaning device according to claim 1, wherein internal corners of obtuse angle that are formed between the feed fin and the drum inner circumferential surface on both sides of the feed fin in a direction along the drum center axis.

7. The workpiece cleaning device according to claim 6, wherein an angle θ of an internal corner when cut along a plane including the drum center axis satisfies:

110°≤θ≤130°.

8. The workpiece cleaning device according to claim 6, wherein the feed fin has a tapered shape from the drum inner circumferential surface along a height direction of the feed fin.

9. The workpiece cleaning device according to claim 6, wherein an interval between adjacent fin portions of the feed fin in the direction of the drum center axis line is gradually increased from the drum inner circumferential surface along a height direction of the feed fin.

10. The workpiece cleaning device according to claim 6, wherein the feed fin has:
a first side surface portion facing one side of a direction of the drum center axis line;
a second side surface portion facing the other side of the direction of the drum center axis line; and
a top surface portion for connecting the first and second side surface portion with each other, and
wherein the top surface portion is defined by a convex curved surface.

11. The workpiece cleaning device according to claim 10, wherein the feed fin is a fin made of sheet metal,
the fin has a corner portion provided with the top surface portion, and a first side plate portion provided with the first side surface portion and a second side plate portion provided with the second side surface portion, the first and second side plate portions being connected with each other in the corner portion, and
the fin is opened toward a side of the drum inner circumferential surface.

12. The workpiece cleaning device according to claim 11, wherein the plate member is inserted between the drum inner circumferential surface and the first and second side plate portions of the feed fin.

13. The workpiece cleaning device according to claim 11, wherein a portion of the drum body between the first and second side plate portions of the feed fin is deformed in a circular arc shape so that the portion is protruded between the first and second side plate portions.

* * * * *